US010219206B2

(12) United States Patent
Faccin et al.

(10) Patent No.: US 10,219,206 B2
(45) Date of Patent: Feb. 26, 2019

(54) SELECTING A NETWORK NODE BASED ON PRECEDENCE OF NETWORK POLICIES

(71) Applicant: QUALCOMM Incorporated, San Diego, CA (US)

(72) Inventors: Stefano Faccin, Hayward, CA (US); Gerardo Giaretta, La Jolla, CA (US)

(73) Assignee: QUALCOMM Incorporated, San Diego, CA (US)

(*) Notice: Subject to any disclaimer, the term of this patent is extended or adjusted under 35 U.S.C. 154(b) by 410 days.

(21) Appl. No.: 14/214,115

(22) Filed: Mar. 14, 2014

(65) Prior Publication Data
US 2014/0287746 A1 Sep. 25, 2014

Related U.S. Application Data

(60) Provisional application No. 61/804,582, filed on Mar. 22, 2013.

(51) Int. Cl.
H04W 48/18 (2009.01)
H04W 48/20 (2009.01)
(Continued)

(52) U.S. Cl.
CPC ........... *H04W 48/18* (2013.01); *H04W 48/02* (2013.01); *H04W 48/04* (2013.01); *H04W 48/08* (2013.01);
(Continued)

(58) Field of Classification Search
CPC ............. H04W 36/00; H04W 36/0027; H04W 36/0083; H04W 36/26; H04W 36/28;
(Continued)

(56) References Cited

U.S. PATENT DOCUMENTS 8,971,239 B2* 3/2015 Oba et al. ...................... 370/326
2007/0183410 A1* 8/2007 Song ................. H04M 3/42008
370/352
(Continued)

FOREIGN PATENT DOCUMENTS

CN 101223804 A 7/2008
JP 2011527136 10/2011
(Continued)

OTHER PUBLICATIONS

International Search Report and Written Opinion—PCT/US2014/030630—ISA/EPO—Jun. 27, 2014.

Primary Examiner — Meless N Zewdu
(74) Attorney, Agent, or Firm — Arent Fox, LLP

(57) ABSTRACT

In one or more mobile stations of a wireless communication network, a method for network node selection in a wireless communication system by a mobile entity may include receiving, from a home network, a message comprising a policy associated with network node selection, determining whether the home network policy has precedence over a policy of a visited network based on the message, and selecting a network node based on the policy of the home network, in response to determining the home network policy has precedence over the visited network policy. The policy may include at least one of mobility or routing policies. The message may include an indication of precedence between the home network and one or more visited networks. A communication apparatus, for example a mobile entity, may be configured for performing these and other aspects of the method.

43 Claims, 10 Drawing Sheets

(51) Int. Cl.
*H04W 48/14* (2009.01)
*H04W 48/02* (2009.01)
*H04W 48/12* (2009.01)
*H04W 48/04* (2009.01)
*H04W 48/08* (2009.01)
*H04W 72/04* (2009.01)
*H04W 8/06* (2009.01)
*H04W 72/00* (2009.01)
*H04W 8/02* (2009.01)
*H04W 76/10* (2018.01)
*H04W 8/04* (2009.01)
*H04W 72/12* (2009.01)
*H04W 36/14* (2009.01)
*H04W 36/24* (2009.01)

(52) U.S. Cl.
CPC ........... *H04W 48/12* (2013.01); *H04W 48/14* (2013.01); *H04W 48/20* (2013.01); *H04W 72/0493* (2013.01); *H04W 8/02* (2013.01); *H04W 8/04* (2013.01); *H04W 8/06* (2013.01); *H04W 36/14* (2013.01); *H04W 36/24* (2013.01); *H04W 72/00* (2013.01); *H04W 72/04* (2013.01); *H04W 72/1242* (2013.01); *H04W 72/1257* (2013.01); *H04W 76/10* (2018.02)

(58) Field of Classification Search
CPC ........... H04W 4/02; H04W 8/08; H04W 8/04; H04W 8/06; H04W 8/14; H04W 8/16; H04W 48/04; H04W 48/18; H04W 48/20; H04W 48/02; H04W 48/17; H04W 72/0493; H04W 48/08; H04W 48/12; H04W 48/14; H04W 72/00; H04W 72/04; H04W 72/1257; H04W 72/1242; H04W 36/14; H04W 36/24; H04W 76/10; H04W 8/02

See application file for complete search history.

(56) References Cited

U.S. PATENT DOCUMENTS

| | | | |
|---|---|---|---|
| 2009/0196265 A1* | 8/2009 | Mariblanca Nieves | ............ H04W 8/065 370/338 |
| 2009/0239531 A1* | 9/2009 | Andreasen et al. | .......... 455/433 |
| 2011/0201338 A1* | 8/2011 | Zou | ............... 455/436 |
| 2012/0093031 A1* | 4/2012 | Wang et al. | .................. 370/254 |
| 2012/0100849 A1* | 4/2012 | Marsico | .................... 455/432.1 |
| 2012/0309447 A1* | 12/2012 | Mustajarvi et al. | .......... 455/524 |
| 2014/0187252 A1* | 7/2014 | Gupta et al. | .................. 455/450 |

FOREIGN PATENT DOCUMENTS

| | | |
|---|---|---|
| WO | 2006133720 A1 | 12/2006 |
| WO | 2011050835 A1 | 5/2011 |
| WO | 2011082833 A1 | 7/2011 |
| WO | 2011087223 A2 | 7/2011 |
| WO | 2012135467 A1 | 10/2012 |

* cited by examiner

SELECTING A NETWORK NODE BASED ON PRECEDENCE OF NETWORK POLICIES

CROSS-REFERENCE TO RELATED APPLICATION

This application claims priority under 35 U.S.C. § 119(e) to U.S. provisional application Ser. No. 61/804,582 filed Mar. 22, 2013, which application is incorporated herein by reference, in its entirety, including the Appendices thereof.

FIELD

Aspects of the present disclosure relate generally to wireless communication systems, and more particularly, to selection of mobile networks by access terminals or other devices.

BACKGROUND

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (WCDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks. High Speed Uplink Packet Access (HSUPA) is a data service offered on the uplink of UMTS networks.

A wireless communication network may include a number of access point that can support communication for a number of mobile devices, such as, for example, mobile stations (STA), laptops, cell phones, PDAs, tablets, or similar terminal devices. A STA may communicate with an access point via the downlink (DL) and uplink (UL). The DL (or forward link) refers to the communication link from the access point to the STA, and the UL (or reverse link) refers to the communication link from the STA to the access point.

Mobile stations may move between coverage areas of different wireless networks. For example, a mobile station may often be in an area covered by its Home Public Land Mobile Network (H-PLMN), and occasionally be in a different coverage area served by a Visited Public Land Mobile Network (V-PLMN) that is controlled by a different operator. Also, mobile stations may be equipped to use different radio access technologies (RATs) via different interfaces, for example, Wireless Local Area Network (WLAN) as defined by IEEE 802.11 standards, or 3GPP. Because of increasing inter-network and inter-RAT complexities, network selection and radio interface selection by a mobile station may involve conflicting rule sets and sub-optimal solutions, for which more optimal solutions are desirable.

SUMMARY

Methods, apparatus and systems for decoupling WLAN selection from Public Land Mobile Network (PLMN) or provider selection by a mobile station in a wireless communication system are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

A method for network node selection in a wireless communication system by a mobile entity may include receiving, from a home network, a message comprising a policy associated with network node selection. In an aspect, the message may include an indication of precedence between the home network and one or more visited networks. The indication of precedence may include an indication of preference for one of the home network or a visited network. The receiving may include, for example, receiving the message based on a trigger at the home network, or receiving the message in response to a request from the mobile entity.

The method may further include determining whether the home network policy has precedence over a policy of a visited network based on the message. This may include, for example, determining that the home network policy has precedence based on a indication of precedence in the message from the home network. In an aspect, the home network may be, or may include, a home public land mobile network (H-PLMN) and the visited network may be, or may include, a visited PLMN (V-PLMN). In another aspect, the visited network may be a registered network of the mobile entity.

In addition, the method may include selecting a network node based on the policy of the home network in response to determining the home network policy has precedence over the visited network policy. In an aspect, the policy may include at least one of mobility or routing policies. Selecting the network node based on the policy of the visited network may include, for example, making the selection in response to determining that the visited network policy has precedence over the home network policy.

In an aspect, an indication of precedence from a home network may include an access node list. In such case, the determining may include matching the visited network to an entry in the access node list, and determining that the home network policy has precedence if the visited network is not matched to an entry in the access node list, and the visited network policy has precedence if the visited network is matched to an entry in the access node list.

In another aspect, the method may include attempting to retrieve, or retrieving, the visited network policy in response to determining that the visited network policy has precedence. In an alternative aspect, or in addition, the method may include selecting a network node based on the policy of the home network in response to failing to retrieve the visited network policy or retrieving no applicable visited network policy.

In other, related aspects, the policy may include service provider policies, and the determining may include determining that the home network policy has precedence in the case of service provider policies. In addition, for embodiment wherein the policy is, or includes, service provider policies, selecting the network node, the selecting may include selecting an access network node based on the mobility or routing policies, and selecting a service provider for authentication based on the service provider policies.

In other aspects, the method may include receiving, from the visited network, another message comprising another policy associated with network node selection. In such case, the method may further include selecting a network node based on the policy of the visited network, in response to determining the visited network policy has precedence over the home network policy. In an alternative aspect, the method may include receiving, from the visited network, another message comprising another policy associated with network node selection, and ignoring the visited network policy in response to determining the home network policy has precedence over the visited network policy.

In related aspects, a wireless communication apparatus may be provided for performing any of the methods and aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such as a mobile entity, for example, user equipment, mobile stations, user terminals, laptop computers, cell phones, PDAs, tablet computers, terminals installed in vehicles, or similar mobile terminal devices. Similarly, an article of manufacture may be provided, including a computer-readable storage medium holding encoded instructions, which when executed by a processor, cause a mobile entity to perform the methods and aspects of the methods as summarized above.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
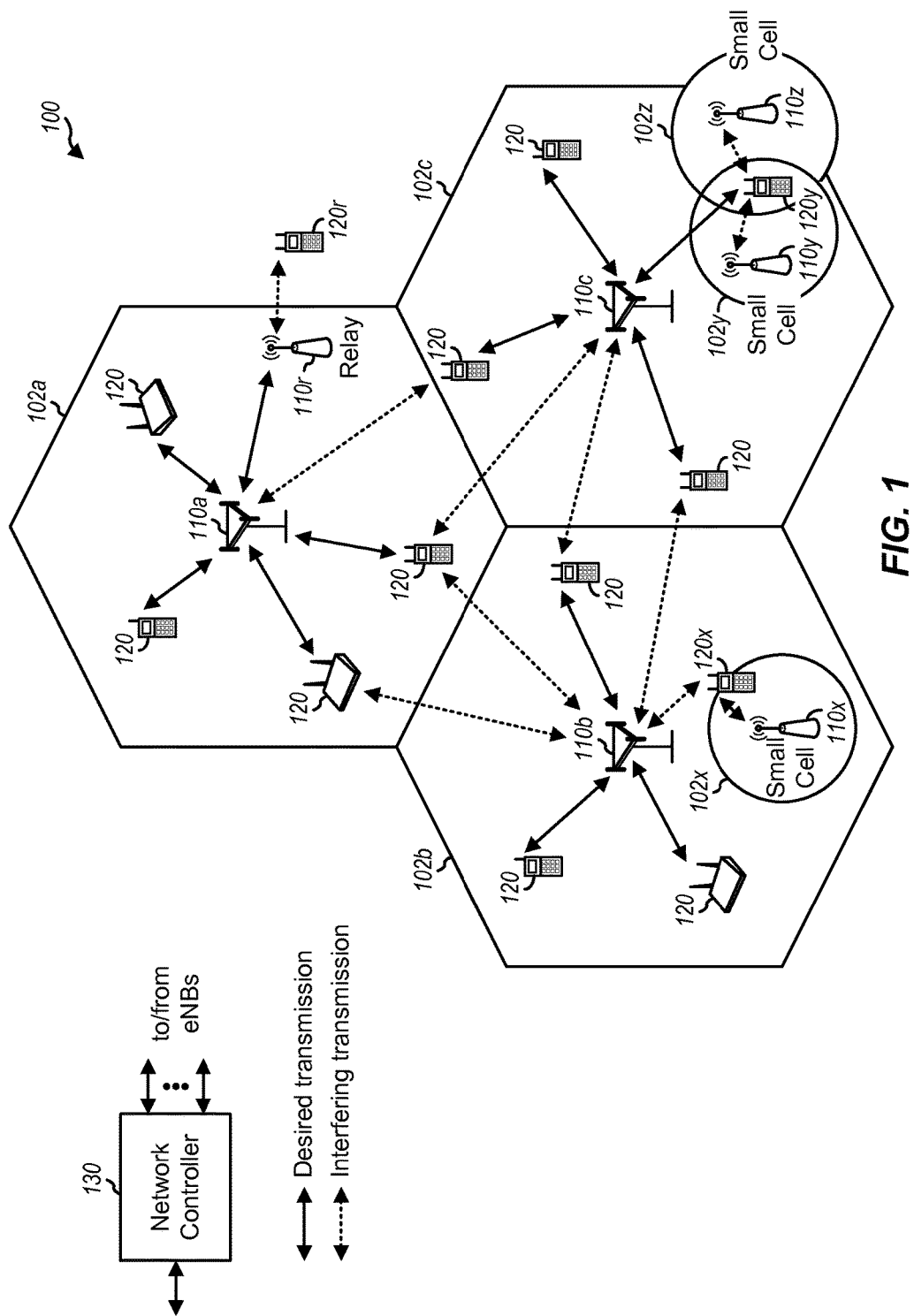
FIG. 1 is a block diagram conceptually illustrating an example of a wireless communication system.

FIG. 1 shows a wireless communication network 100, which may be an LTE network. The wireless network 100 may include a number of eNBs 110 and other network entities. An eNB may be a station that communicates with the UEs and may also be referred to as a base station, a Node B, an access point, or other term. Each eNB 110a, 110b, 110c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell or small cell (for example, a pico cell, a femto cell, and/or other types of cell). A macro cell may cover a relatively large geographic area (e.g., several kilometers in radius) and may allow unrestricted access by UEs with service subscription. A small cell of a type sometimes referred to as a "pico cell" may cover a relatively small geographic area and may allow unrestricted access by UEs with service subscription. A small cell of a type sometimes referred to as a "femto cell" may cover a relatively small geographic area (e.g., a home) and may allow restricted access by UEs having association with the femto cell (e.g., UEs in a Closed Subscriber Group (CSG), UEs for users in the home, etc.). In heterogeneous cellular wireless systems including base stations of widely varying power, base stations may be broadly categorized as "macro" cells or small cells. Femto cells and pico cells are examples of small cells. As used herein, a small cell means a cell characterized by having a transmit power substantially less than each macro cell in the network with the small cell, for example low-power access nodes such as defined in 3GPP Technical Report (T.R.) 36.932 V12.1.0, Section 4 ("Introduction").

An eNB for a macro cell may be referred to as a macro eNB. An eNB for a pico cell may be referred to as a small cell eNB or pico eNB. An eNB for a femto cell may be referred to as a small cell eNB, femto eNB or a home eNB (HNB). In the example shown in FIG. 1, the eNBs 110a, 110b and 110c may be macro eNBs for the macro cells 102a, 102b and 102c, respectively. The small cell eNB 110x may be a pico eNB for a pico cell 102x, serving a UE 120x. The small cell eNBs 110y and 110z may be femto eNBs for the femto cells 102y and 102z, respectively. An eNB may support one or multiple (e.g., three) cells.

The wireless network 100 may also include relay stations 110r. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g., macro eNBs, small cell eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. Broadcast multicast operations may require synchronization of base stations within a defined area, but the present technology is not limited thereby. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, or other mobile devices. A UE may be able to communicate with macro eNBs, pico eNBs, femto eNBs, relays, or other network entities. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
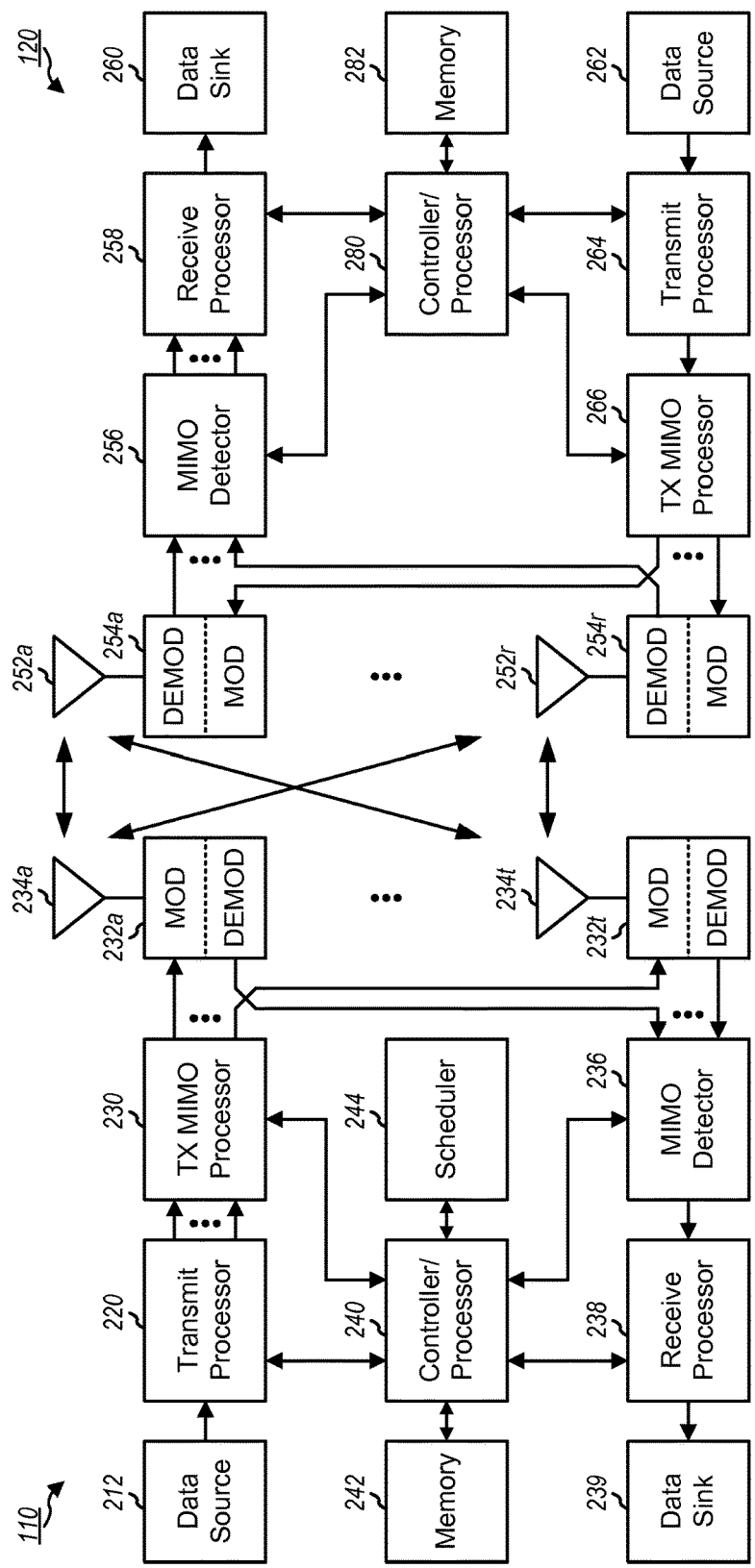
FIG. 2 is a block diagram conceptually illustrating a design of a base station/eNB and a UE configured according to one aspect of the present disclosure.

FIG. 2 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type. The base station 110 may be equipped with antennas 234a through 234t, and the UE 120 may be equipped with antennas 252a through 252r.

At the base station 110, a transmit processor 220 may receive data from a data source 212 and control information from a controller/processor 240. The control information may be for the PBCH, PCFICH, PHICH, PDCCH, etc. The data may be for the PDSCH, etc. The processor 220 may process (e.g., encode and symbol map) the data and control information to obtain data symbols and control symbols, respectively. The processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the base station 110 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at the UE 120, a transmit processor 264 may receive and process data (e.g., for the PUSCH) from a data source 262 and control information (e.g., for the PUCCH) from the controller/processor 280. The processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 110. At the base station 110, the uplink signals from the UE 120 may be received by the antennas 234, processed by the demodulators 232, detected by a MIMO detector 236 if applicable, and further processed by a receive processor 238 to obtain decoded data and control information sent by the UE 120. The processor 238 may provide the decoded data to a data sink 239 and the decoded control information to the controller/processor 240.

The controllers/processors 240 and 280 may direct the operation at the base station 110 and the UE 120, respectively. The processor 240 and/or other processors and modules at the base station 110 may perform or direct the execution of various processes for the techniques described herein. The processor 280 and/or other processors and modules at the UE 120 may also perform or direct the execution of the functional blocks illustrated in FIGS. 4 and 5, and/or other processes for the techniques described herein. The memories 242 and 282 may store data and program codes for the base station 110 and the UE 120, respectively. A scheduler 244 may schedule UEs for data transmission on the downlink and/or uplink.

In one configuration, the UE 120 for wireless communication includes means for detecting interference from an interfering base station during a connection mode of the UE, means for selecting a yielded resource of the interfering base station, means for obtaining an error rate of a physical downlink control channel on the yielded resource, and means, executable in response to the error rate exceeding a predetermined level, for declaring a radio link failure. In one aspect, the aforementioned means may be the processor(s), the controller/processor 280, the memory 282, the receive processor 258, the MIMO detector 256, the demodulators 254a, and the antennas 252a configured to perform the functions recited by the aforementioned means. In another aspect, the aforementioned means may be a module or any apparatus configured to perform the functions recited by the aforementioned means.

One mechanism to facilitate high bandwidth communication for multimedia has been single frequency network (SFN) operation. Particularly, Multimedia Broadcast Multicast Service (MBMS) and MBMS for LTE, also known as evolved MBMS (eMBMS) (including, for example, what has recently come to be known as multimedia broadcast single frequency network (MBSFN) in the LTE context), can utilize such SFN operation. SFNs utilize radio transmitters, such as, for example, eNBs, to communicate with subscriber UEs. Groups of eNBs can transmit information in a synchronized manner, so that signals reinforce one another rather than interfere with each other. In the context of eMBMS, the shared content is transmitted from multiple eNB's of a LTE network to multiple UEs. Therefore, within a given eMBMS area, a UE may receive eMBMS signals from any eNB (or eNBs) within radio range. However, to decode the eMBMS signal each UE receives Multicast Control Channel (MCCH) information from a serving eNB over a non-eMBMS channel. MCCH information changes from time to time and notification of changes is provided through another non-eMBMS channel, the PDCCH. Therefore, to decode eMBMS signals within a particular eMBMS area, each UE is served MCCH and PDCCH signals by one of the eNBs in the area.

Figure 3:
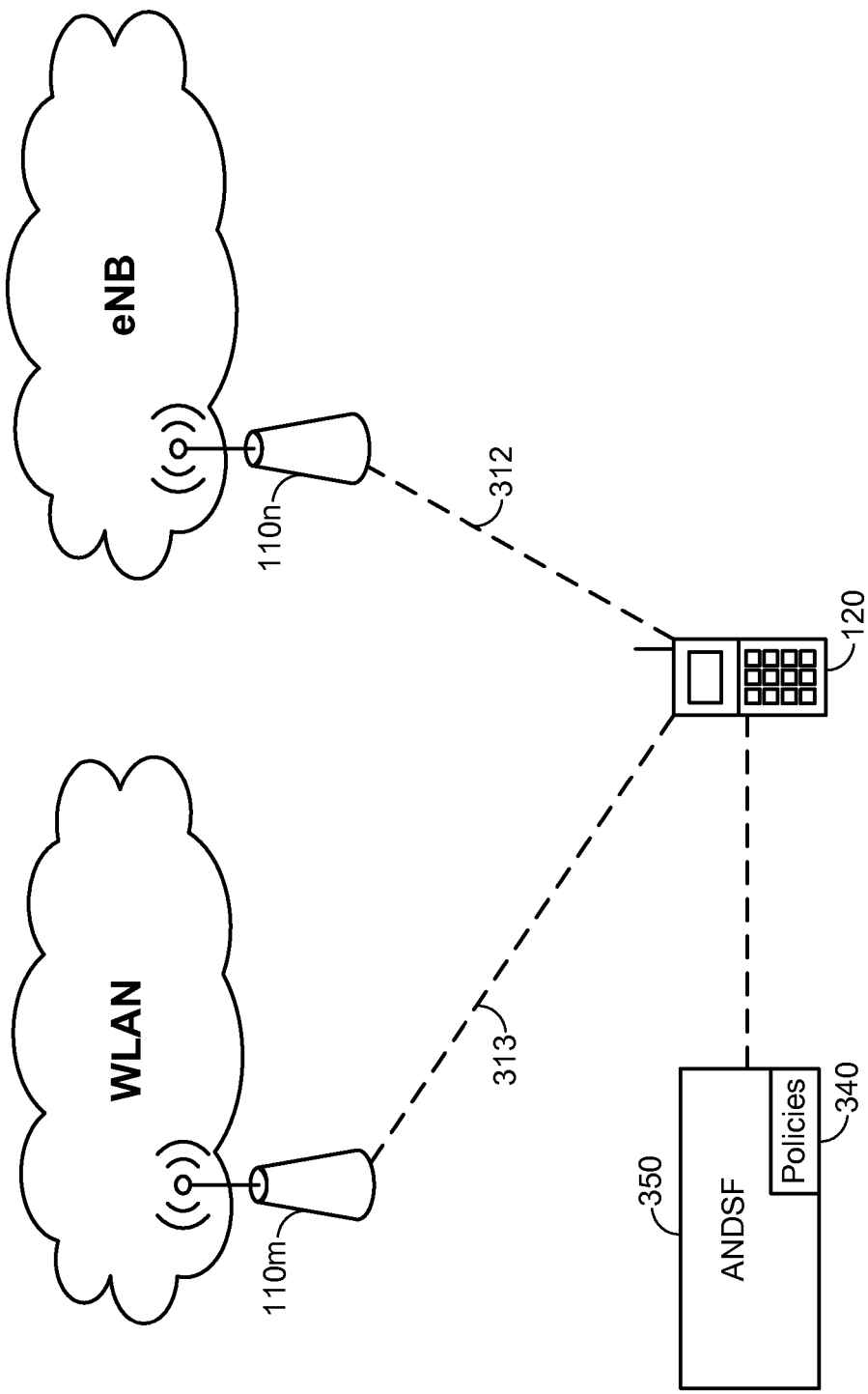
FIG. 3 is a block diagram conceptually illustrating an example wireless communication system including a WLAN and eNB.

FIG. 3 illustrates an example of a telecommunications system 300 including a WLAN and eNB. For example, with reference to the example system 300 shown in FIG. 3, a 3rd Generation Partnership Project (3GPP) Evolved Packet System (EPS) network has the UE 120 connected to both a LTE (3GPP EPS) network node 110n and a Wireless Local Area Network (WLAN) node 110m via one communication link 312 and a second communication link 313, respectively. The UE 120 may be provided with policies 340. The UE 120 may be in communication with either, both, or neither of the nodes 110n, 110m. One skilled in the art would understand that although two communication links are described, the present disclosure is not limited to the two communication links. Other quantity of communication links may be used without affecting the scope or spirit of the present disclosure.

In one example, the components or modules of the network providing the policies 340 may include an Access Network Discovery and Selection Function (ANDSF) entity or module 350. In one example, the communication protocol between the ANDSF 350 and the UE 120 may utilize an Open Mobile Alliance Device Management (OMA-DM) protocol or the like. Based on OMA-DM specifications, the information exchanged by the UE 120 and the ANDSF 350 may be defined in a Management Object (MO). For example, the MO for ANDSF to UE communication may be specified in the 3GPP Technical Specification (TS) 24.312 or the like.

The ANDSF 350 may contain data management and control functionality necessary to provide network discovery and selection assistance data as per operators' policy. The ANDSF 350 may respond to UE 120 requests for access network discovery information (in a 'pull' mode operation). The ANDSF 350 may be able to initiate data transfer to the UE 120 (in a 'push' mode operation) based on network triggers or as a result of previous communication with the UE. In the 'push' mode operation, the ANDSF 350 may be able to initiate data transfer to the UE without a prior request from the UE 120.

The ANDSF 350 may provide the following information. The ANDSF 350 may provide 1) inter-system mobility policy. The inter-system mobility policy may be a set of operator-defined rules and preferences that affect the inter-system mobility decisions taken by the UE 120. The UE 120 may use the inter-system mobility policy when the UE 120 can route IP traffic only over a single radio access interface at a given time (e.g., the UE 120 is not IP flow mobility (IFOM) capable or the UE's 120 IFOM capability is disabled). The UE 120 may use the inter-system mobility policy to (i) decide when inter-system mobility is allowed or restricted, and (ii) to select the most preferable access technology type or access network that should be used to access EPC.

For example, an inter-system mobility policy may indicate that inter-system handover from E-UTRAN access to WLAN access is not allowed. It may also indicate, e.g., that Worldwide Interoperability for Microwave Access (WiMAX) access is more preferable to WLAN access. The inter-system mobility policy may be provisioned in the UE 120 and may be updated by the ANDSF 350 based on network triggers or after receiving a UE 120 request for network discovery and selection information. The inter-system mobility policy identifies which access technology type or which specific access network is mostly preferable for Evolved Packet Core (EPC) access. The inter-system mobility policy may be able to indicate (i) if a specific access technology type is preferable to another (e.g. WiMAX is preferable to WLAN), and (ii) if a specific access network identifier is preferable to another (e.g., WLAN SSID 1 is preferable to WLAN SSID 2).

The inter-system mobility policy may identify also when inter-system mobility is allowed or restricted. The inter-system mobility policy may be able to indicate (i) if inter-system mobility is restricted from one access technology type to another (e.g., handover from WiMAX to WLAN is restricted), (ii) if inter-system mobility is restricted when certain conditions are met, (iii) validity conditions, i.e. conditions indicating when a policy is valid (such conditions may include, e.g., a time duration, a location area, etc.). The validity conditions may also indicate when the UE 120 may make a request for new policies.

The inter-system mobility policy may indicate whether the operator-preferred list of access networks or access technology types for Evolved Packet Core (EPC) access, may take precedence over corresponding user-preferred list, when automatic access network selection is used.

The ANDSF 350 may be able to provide inter-system routing policy (ISRP). The ANDSF 350 may provide a list of ISRPs to the UE 120 independently of the UE 120 capability that are capable of routing IP traffic simultaneously over multiple radio access interfaces. The UE 120 uses the inter-system routing policies when it can route IP traffic simultaneously over multiple radio access interfaces (e.g., it is an IP Flow Mobility (IFOM) capable UE with the IFOM capability enabled or a Maintenance, Planning and Control (MAPCON) capable UE with the MAPCON capability enabled) in order to meet the operator routing/offload preferences.

There are three types of information provided by the ANDSF 350, i.e., the inter-system mobility policy (ISMP), the access network discovery information (ANDI), and the inter-system routing policy (ISRP). The ANDSF may provide all types of information or only one of them.

A home ANDSF (H-ANDSF) selects the inter-system mobility policies, the access network discovery information, and the inter-system routing policies to be delivered to the UE according to the operator requirements and the roaming agreements. If the permanent UE identity may be known to the H-ANDSF, and subject to operator's configuration, the available subscription data (e.g. the list of access networks, or access technology types, the UE may be authorized to use, etc.) may also be used by the H-ANDSF for selecting the inter-system mobility policies, the access network discovery information and the inter-system routing policies.

A visited ANDSF (V-ANDSF) selects the inter-system mobility policies, the access network discovery information, and the inter-system routing policies to be delivered to the UE according to the operator requirements and the roaming agreements.

If the UE 120 has access network discovery information, inter-system mobility policies or inter-system routing policies valid for its present location, which indicate that there may be an access network in its vicinity with higher priority than the currently selected access network(s), the UE 120 may perform procedures for discovering and reselecting the higher priority access network, if this may be allowed by user preferences.

A UE that may not be capable of routing IP traffic simultaneously over multiple radio access interfaces (e.g. a non-IFOM or non-MAPCON capable UE, or a UE that has such a capability disabled, or a UE not capable of non-seamless WLAN offload) may select the most preferable available access network for inter-system mobility based on the received/provisioned inter-system mobility policies and user preferences and may disregard the inter-system routing policies it may have received from the ANDSF. When automatic access network selection may be used, the UE may not initiate a connection to the EPC using an access network indicated as restricted by inter-system mobility policies. When the UE selects a non-3GPP radio access as indicated by the preferences in the inter-system mobility policies, the UE may still use 3GPP access for CS services.

A UE that may be capable of routing IP traffic simultaneously over multiple radio access interfaces (i.e. an IFOM or MAPCON capable UE, or a UE capable of non-seamless WLAN offload) may be pre-provisioned with or may be able to receive from the ANDSF (if the UE supports communication with ANDSF) both inter-system mobility policies and inter-system routing policies. When the UE has the IFOM, the MAPCON and the non-seamless WLAN offload capabilities disabled, the UE may select the most preferable available access network based on the received/provisioned inter-system mobility policies and user preferences. When the UE has the IFOM or MAPCON or non-seamless WLAN offload capability enabled, the UE may select the most preferable available access networks based on the received/provisioned inter-system routing policies and user preferences. In addition, the UE may route traffic that matches specific IP traffic filters according to the filter rules in the received/provisioned inter-system routing policies and according to the user preferences.

When roaming, it may be possible for the UE to resolve potential conflicts between the policies provided by the H ANDSF and the policies provided by the V ANDSF. This applies to both the inter-system mobility policies and to the inter-system routing policies. The UE behavior when receiving policies from H-ANDSF and V-ANDSF may be specified in clause 4.8.0 and in 3GPP TS 24.302.

If more than one set of Inter-system mobility policies may be available in the UE, the UE may use one set of Inter-system mobility policies at any one time. If available, the inter-system mobility policy of the RPLMN may take precedence. For example, when roaming, the Inter-system mobility policy from V-ANDSF of the RPLMN, if available, may take precedence over the Inter-system mobility policy from the H-ANDSF.

I-WLAN network selection procedure may be applicable to initial network selection at WLAN UE switch-on and following recovery from lack of WLAN radio coverage. It may not be clear however if I-WLAN network selection may be applicable in other scenarios except from switch-on and recovery from lack of radio coverage. Given this lack of clarity, an assumption has been made that I-WLAN network selection should be executed by the WLAN UE every time it activates its WLAN radio interface. However, this assumption may not be necessarily correct especially after the introduction of ANDSF which can trigger the UE to activate its WLAN radio interface in order to perform access selection (within the same PLMN) and/or IP flow mobility.

Furthermore, if the UE does not perform the I-WLAN network selection procedure (as per 3GPP TS 24.234) and the UE attempts EAP-AKA over an SSID (e.g. provided by the ANDSF), it may not be clear how the UE selects a NAI when the selected SSID does not support interworking with the HPLMN. The following summarizes stage 3 procedures for WLAN selection. I-WLAN PLMN selection was developed in Release 6. The selection may consist of two steps: 1) WLAN selection, and 2) PLMN selection.

The procedure may be applicable to initial network selection (i.e. at WLAN UE switch on) and upon recovery from lack of WLAN coverage. In this 2 step process I-WLAN PLMN selection may be based mainly on the optional files stored in the Universal Subscriber Identity Module (USIM) as defined in 3GPP TS 31.102 or the 3GPP System to Wireless Local Area Network interworking Management Object (WLAN MO) defined in 3GPP TS 24.235 and used by 3GPP TS 23.234 and 3GPP TS 24.234. In terms of information contained: (i) the USIM contains, in summary, Wi-Fi information such as a list of SSIDs, and PLMN information (i.e. PLMNs defined by mobile country code (MCC) or mobile network code (MNC)), and (ii) the MO contains, in summary, Wi-Fi information such as a list of SSIDs, and PLMN information (i.e. PLMN realms, defined per RFC 4282).

Since PLMN selection may be the driving factor, then once a PLMN has been chosen, the UE can then only use an SSID (specific WLAN) that connects to that PLMN. If none of the above data exists, then PLMN selection may be still performed based on 3GPP T.S. 24.234 but just for (E)HPLMN selection. (E)HPLMN selection can be based upon: (i) UE pre-configuration or else by selecting SSID's at random, (ii) HPLMN selection may be based on using the EFEHPLMN file in the USIM (ref 31.102), and (iii) If the EHPLMN file may not be present, the UE chooses the EHPLMN based on the IMSI (ref 31.102).

The UE may be expected to either have the necessary files in the USIM, or be configured in some proprietary way. The home operator can provision the information in the USIM (to be used as above) or in the WLAN MO (to be used as per 3GPP TS 24.234 procedures).

ANDSF may introduce mechanisms to enable WLAN selection under specific conditions, defined by ANDSF rules. ANDSF may assist the UE in discovering available WLANs, and it assists the UE in using the WLAN vs. cellular interface. The ANDSF MO has a rich set of information and rules to achieve traffic routing and access selection based on the desired policies, whereas the WLAN MO does not contain any information e.g. on APNs, application related filters, etc. that are present in the ANDSF MO. However, when ANDSF may be deployed, the WLAN selection may be still determined by the PLMN selection procedure which takes into account the WLAN MO if present. In fact, the ANDSF MO may not be used by the UE in PLMN selection, and it is not meant for PLMN selection. After PLMN selection has taken place, the UE can apply active ANDSF policies for traffic routing per 3GPP TS 24.302.

Figure 4:
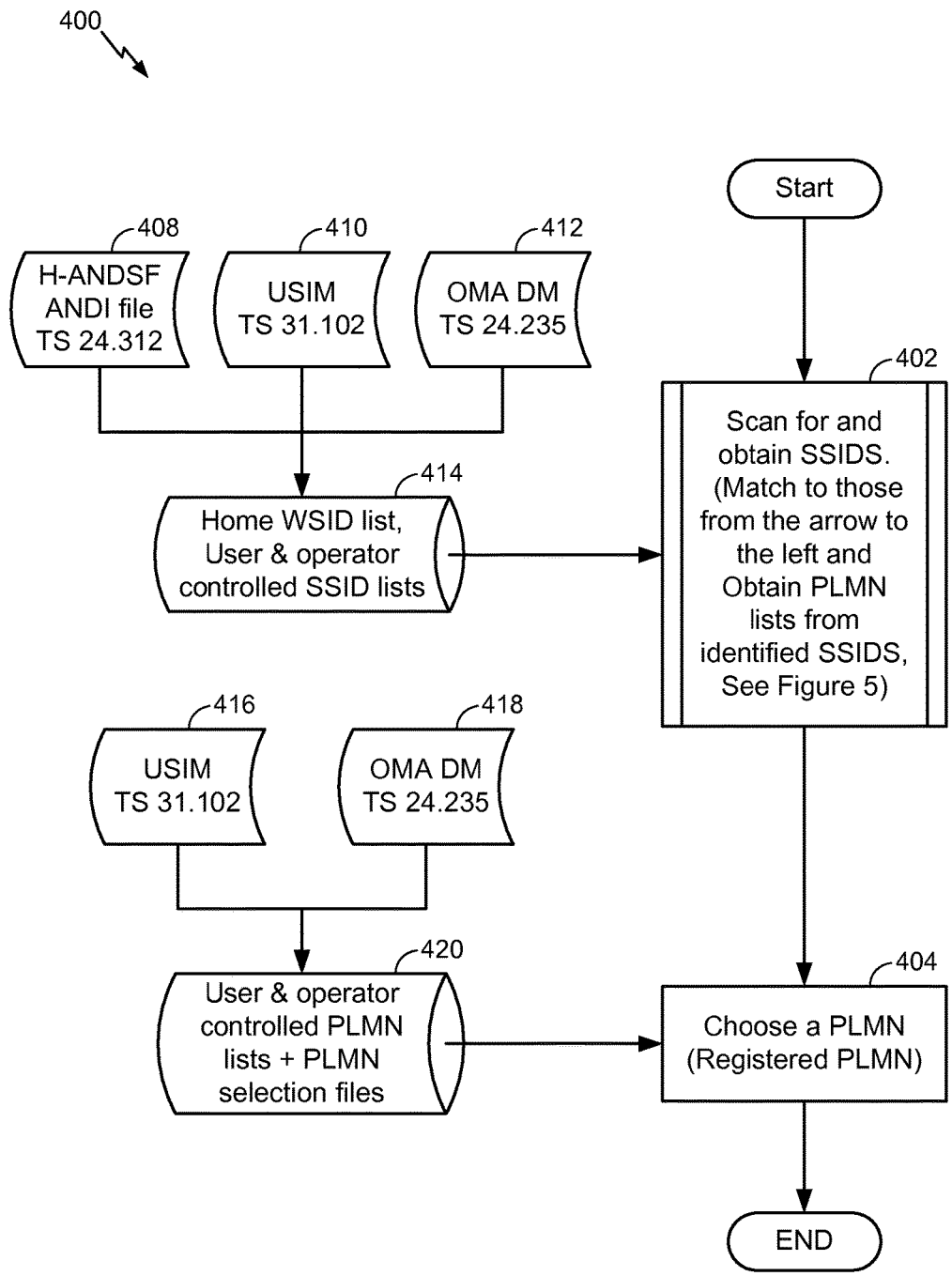
FIG. 4 provides a high level description of Service Set Identifier (SSID) and Public Land Mobile Network (PLMN) selection.
Figure 5:
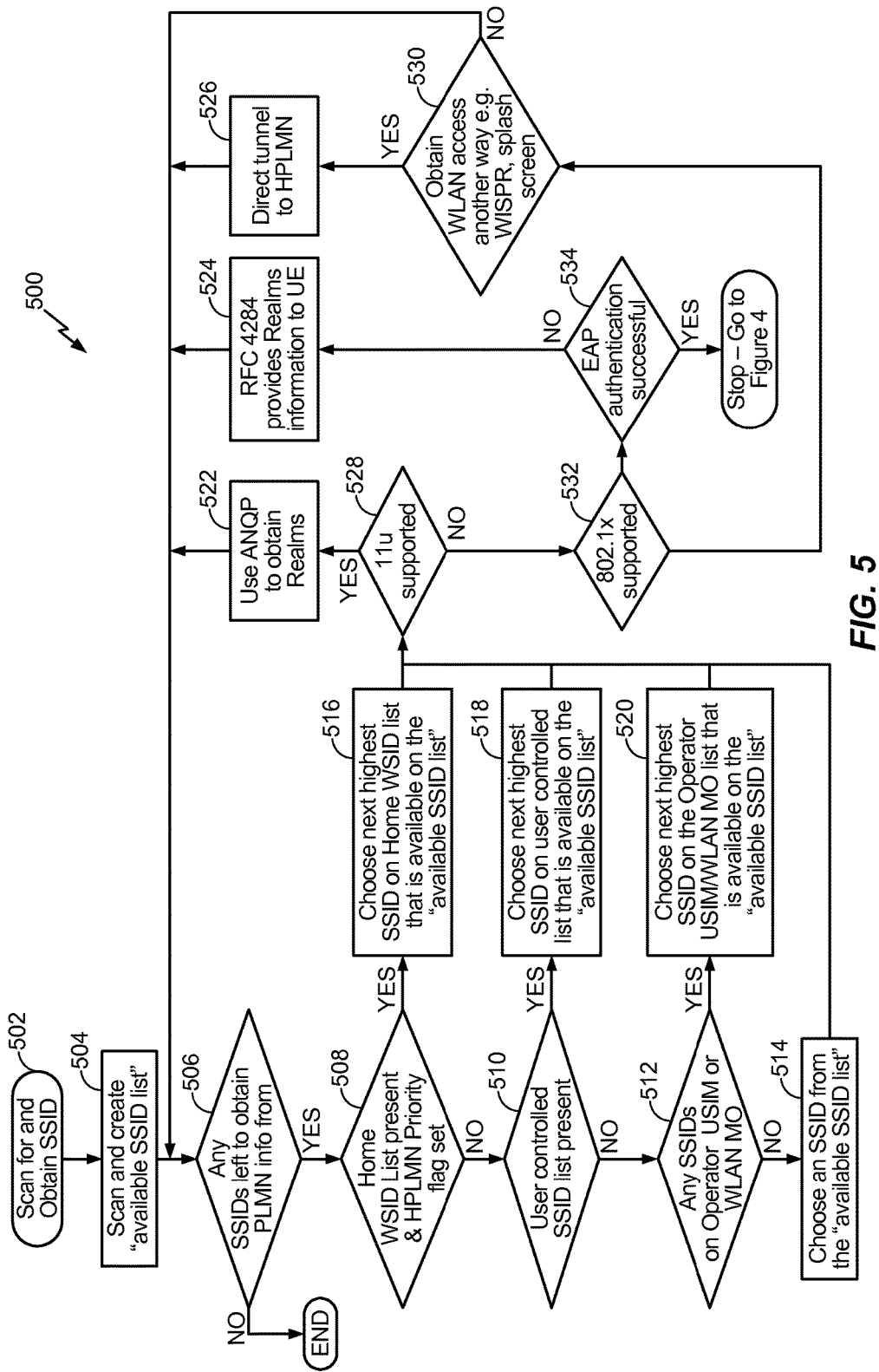
FIG. 5 provides a more detailed view of how SSIDs are chosen and then used to obtain PLMN information.

FIGS. 4 and 5 are diagrams providing a diagrammatic view of PLMN selection. FIG. 4 provides a high level description of a method 400 for SSID/PLMN selection by a UE or other user terminal. The method 400 may include a procedure 402 for obtaining PLMN lists, based on a database 414 including a home wireless system identifier (WSID) list, user controlled SSID list and operator controlled SSID list, and then obtaining PLMN lists based on the identified SSIDs. The procedure 402 may include the UE scanning for SSIDs, and matching discovered SSIDs to SSIDs or WSIDs from the database 414. The database 404 may be populated based on one or more of the external data objects 408, 410 and 412. A first data object 408 may include access network discovery information (ANDI) for an H-ANDSF, as specified in 3GPP TS 34.312. As specified, a UE may initiate the provision of discovery information from the ANDSF using a client initiated session containing a generic alert. A second data object 410 may include optional files stored in the USIM as defined in 3GPP TS 31.102. The USIM may include, for example, Wi-Fi information such as a list of SSIDs. A third data object 412 may include the WLAN MO defined in 3GPP TS 24.235 and used by 3GPP TS 23.234 and 3GPP TS 24.234. The WLAN MO is compatible with the Open Mobile Alliance (OMA) device management (DM) protocol. The WLAN MO may include, for example, Wi-Fi information such as a list of SSIDs, and PLMN information (e.g., PLMN realms, defined per Request for Comments (RFC) 4282 published by the Internet Engineering Task Force (IETF)).

The method 400 may further include, at 404, the user choosing a registered PLMN based on user and operator PLMN lists and selection files obtained from a data store 420. The user and operator PLMN lists and selection files may be determined based on external data objects 416, 418, for example, data object 416 including files stored in the USIM as defined in 3GPP TS 31.102. The USIM may include, for example, PLMN information (i.e. PLMNs defined by MCC, MNC). The data object 418 may include the WLAN MO defined in 3GPP TS 24.235, for example, PLMN information (e.g., PLMN realms, defined per RFC 4282)

FIG. 5 provides a more detailed view of a method 500 by a UE for choosing SSIDs in the procedure for obtaining PLMN lists 402. The initiator block 502 refers to scanning and obtaining an SSID, as also described in connection with the procedure 402. The remaining blocks illustrate more detailed aspects of the scanning and obtaining. The method 500 may include, at 504, scanning an creating an available SSID list. The available SSID list may include an identifier or every wireless network for which a connection to the US is available. At 506, the UE may determine whether or not any SSIDs in the available SSID list are not associated with an identified PLMN or otherwise lack necessary information relating to an associate PLMN. If all PLMN information is present, the method 500 may terminate.

If PLMN information is needed, at 508, the UE may determine whether a home WSID list is present and a home PLMN priority flag set for any SSID on the home WSID. If the indicated condition is true, at 516, the UE may choose the next highest SSID on the home WSID list that is also listed in the available SSID list created at 504. If a home WSID list is not present or a home PLMN priority flag is not set for any SSID on the home WSID, the UE may, at 520, determine whether a user-controlled SSID list is present.

If a user-controlled SSID list is present, the UE may, at 518, choose the next highest SSID on the user-controlled SSID list that is also found in the available SSID list created at 504. If a user controlled SSID list is not present, the UE may, ay 512, determine whether any SSIDs are identified on the operator USIM or WLAN MO. If at least one such SSID is identified, the UE may, at 520, choose the next highest SSID on the operator USIM or WLAN MO that is also found in the available SSID list created at 504. If no such SSID is identified, the UE may, at 514, choose any SSID from the available SSID list created at 504.

On and SSID is selected, the US may, at 528, determine whether the wireless network identified by the SSID supports a desired protocol, for example, IEEE 802.11u. If, for example, 802.11u is supported, the UE may, at 522, use ANQP to obtain PLMN realms for the network, and loop back to box 506. If 802.11u is not supported, the UE may, at 532, determine whether the wireless network identified by the SSID supports any one of desired set of protocols, for example, IEEE 802.1x, wherein 'x' stands for at least the numeric digits 1-9. If one of these protocols is supported, the UE may, at 534, determine whether Extensible Authentication Protocol (EAP) authentication with the network is successful. If EAP authentication with the network is successful, the method 400 may jump to box 404 of FIG. 4. If EAP authentication with the network is not successful, the UE may obtain PLMN realms for the network per RFC 4284, and loop back to box 506.

If the UE determines at 532 that none of the set of desired protocols is supported, the US may, at 530, determine whether WLAN access can be obtained another way, for example, using a splash screen or Wireless Internet Service Provider roaming (WISPr) protocol. If WLAN access can be obtained another way, the UE may, at 526, direct a tunnel to the home PLMN and loop back to box 506. If WLAN access cannot be obtained another way, the UE may loop directly back to box 506.

In accordance with aspects of the subject of this disclosure, there is provided methods and apparatus for WLAN selection for PLMN/service provide selection.

It may be desirable to define a mechanism for ANDSF-based selection for WLAN. The method or mechanism may include using ANDSF to select the most appropriate WLAN network based on ISRP/ISMP. The method or mechanism may include using ANDSF to select the most appropriate PLMN/Service Provider supported by the selected WLAN network for the UE to authenticate with.

If ANDSF management objects (MOs) may be used for service provider/PLMN selection, 3GPP may mandate that the PLMN selection be under control of only the HPLMN, and that the VPLMN may not interfere. Therefore, this may require mandating the HPLMN ANDSF MO to always have priority over the VANDSF MO. However, current ANDSF specifications may require the UE to give precedence to the RPLMN ANDSF MO when the RPLMN may not be the HPLMN, if the device has received both the RPLMN ANDSF MO and the HPLMN MO.

An embodiment may be needed to ensure that it may be possible to use the HPLMN ANDSF MO information to influence the service provider/PLMN selection, while allowing the RPLMN ANDSF MO to influence the WLAN network selection on which service provider/PLMN selection can be performed.

In one aspect, when the HPLMN provides the ANDSF MO to the UE, the HPLMN may provide an indication of whether the RPLMN ANDSF or the H-ANDSF ISMP/ISRP rules may take precedence when the RPLMN is different from the HPLMN. This may allow an HPLMN that has preferences for specific conditions for traffic offloading to indicate to the device how to select the appropriate WLAN network based on the HPLMN conditions. If the UE does not receive such indication, the UE may give precedence to RPLMN ANDSF policies as currently specified in 3GPP TS 24.302.

When performing WLAN network selection, the UE may first select—based on indication from the HPLMN (if present)—whether the RPLMN ANDSF or H-ANDSF ISMP/ISRP rules should be used, if the RPLMN is different from the HPLMN. If no indication is present and the UE has both the RPLMN ANDSF and H-ANDSF ISMP/ISRP rules, then the UE may use the RPLMN ANDSF rules as currently defined for ANDSF.

In another aspect, a new set of policies called Preferred Service Provider Policy (PSPP) may be introduced. PSPP may be separate from ISRP and ISMP and may contain a list of preferred service providers for the device. Service providers may be identified as realms, possibly with the domain name derived from a PLMN ID. This may allow a device to select the preferred service provider to authenticate with upon selecting WLAN based, among other information, on the list of service providers that the device can discover from the WLAN AP based on HS2.0 ANQP query.

PSPP may be provided by the HPLMN through H-ANDSF. The UE may ignore any PSPP information provided by the V-ANDSF. If the UE has both an MO from the V-ANDSF and the H-ANDSF, the UE may use PSPP of the H-ANDSF MO even when the V-ANDSF MO is considered preferred.

Once WLAN network selection has been performed based on ISRP/ISMP, then the UE may use the PSPP to identify the most preferred Service Provider supported by the selected WLAN network. The UE may use the Preferred Service Provider Policies when it selects a WLAN or set of WLAN networks based on other policies or other mechanisms to identify the preferred service provider supported by the selected WLAN.

In accordance with aspects of the subject of this disclosure, there are provided methods and apparatus for network node selection.

Figure 6A:
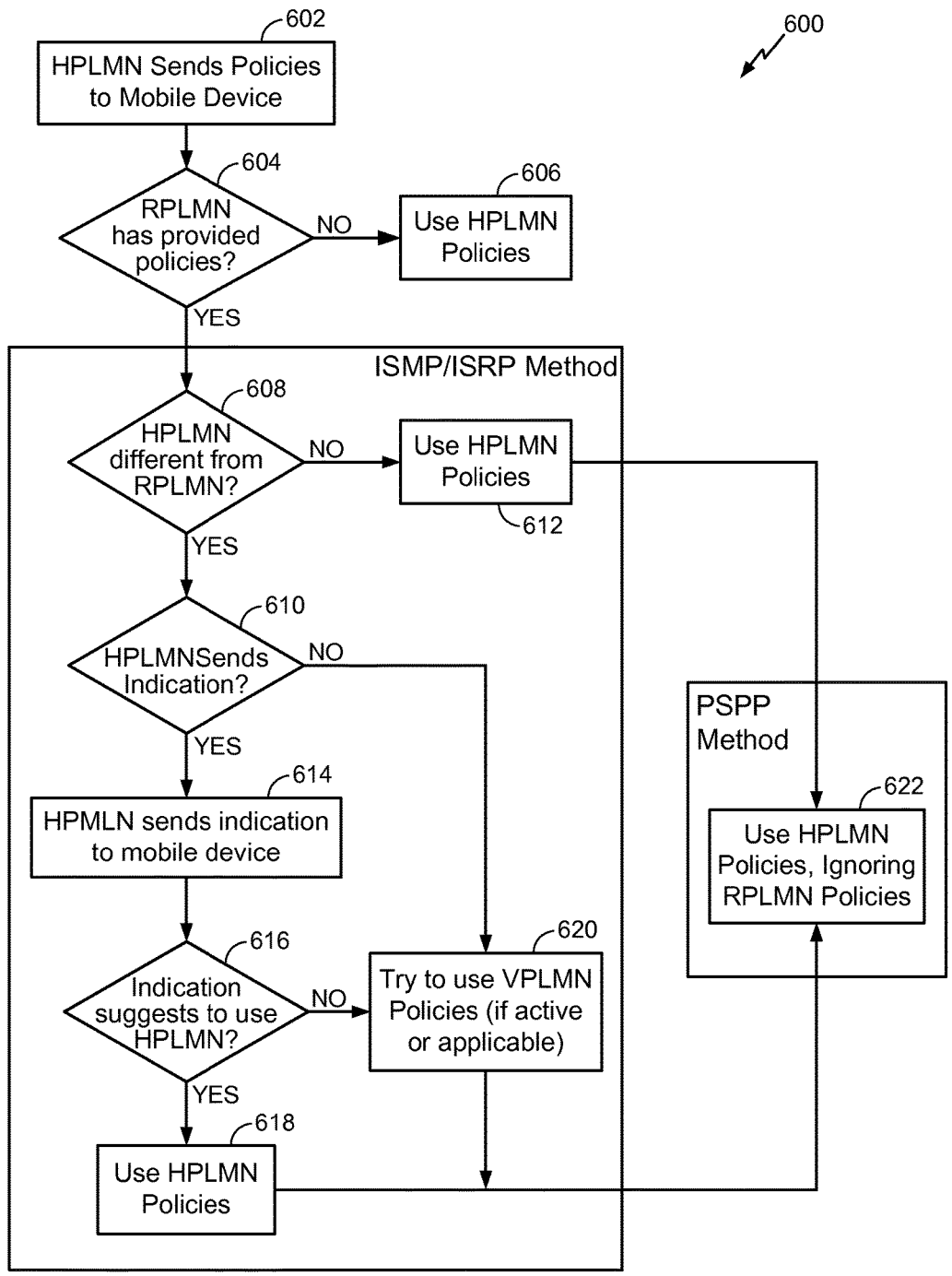
FIG. 6A is a flow diagram illustrating an exemplary method for network node selection and service provider selection.

FIG. 6A is a flow diagram illustrating an exemplary method 600 for network node selection and service provider selection. The method may be performed by a UE, mobile entity, or the like, including interactions with one or more network entities. Network node selection may include selection of a WLAN access point. Network node selection may include selection of a service provider. For example, the network node selection may be based on ISMP, ISRP, and/or PSPP rules. The ISMP, ISRP, and/or PSPP rules may be received from a home PLMN (HPLMN) or visited PLMN (VPLMN). The VPLMN may be a registered PLMN (RPLMN). For example, at 602, the HPLMN may send policies to a mobile device. The method may include, at 604, determining whether the RPLMN has provided policies to the mobile device. If the policies were not provided by the mobile device, the method may include, at 606, using the HPLMN policies for node selection and/or for service provider selection.

If the RPLMN has provided policies, the method may include, at 608, determining whether the HPLMN is different from the RPLMN. If the HPLMN and RPLMN are not different (i.e., they are the same entity), then the method may include, at 612, using HPLMN policies. If the HPLMN and RPLMN are different, then the method may include, at 610, determining whether the HPLMN sent an indication in a message (e.g., in the message with the policies). For example, the indication may dictate whether the policy of the HPLMN or RPLMN is given preference/precedence. For example, the indication may be a binary indication or a list of access nodes. In the case of a binary indication, the indication may state whether the policy of the HPLMN or the RPLMN is preferred or given precedence. In the case of the indication including a list of access nodes, the list may be a preferred list. For example, if a RPLMN is included in the list (e.g., using a matching operation or look up operation of the RPLMN name/identifier in the list), the RPLMN may be given precedence over the HPLMN. If the RPLMN is not included in the list, the RPLMN may be not be given precedence over the HPLMN (i.e., the HPLMN has precedence). If the HPLMN did not send an indication, then the RPLMN may be given precedence.

The method may include, at 616, determining whether the indication suggests using the HPLMN policy (e.g., the indication states the HPLMN is preferred, or the RPLMN is not included in the list). If the HPLMN is suggested, the method may include, at 618, using the HPLMN policy or policies. The UE may try to use the RPLMN policy if the indication suggests using the RPLMN policy or if no indication is provided. If the UE determines that RPLMN policies have precedence and the RPLMN is different from the HPLMN, at 610, and if no RPLMN policies are active or applicable, then the method may include, at 618, using the HPLMN policies.

Additionally or alternatively, if the UE determines that RPLMN policies have precedence and the RPLMN is different from the HPLMN, the method may include, at 616, one or more of retrieving or attempting to retrieve RPLMN policies (e.g., via a 'pull' method). If the UE retrieves the RPLMN policies, the method may include, at 620, using the RPLMN policies. If the UE fails to retrieve RPLMN policies or retrieves no applicable RPLMN policies, then the method may include, at 618, using the HPLMN policies.

The method may further include, at 622, determining a service provider to use in the PSPP method. For example, the HPLMN may have sent policies (e.g., PSPP policies) to the mobile device. In the alternative, or in addition, the RPLMN may have sent policies (e.g., PSPP policies) to the mobile device. The method may include, at 622, determining to use the HPLMN policies (e.g., PSPP policies) in selecting the service provider, and in such case ignoring the RPLMN policies.

Figure 6B:
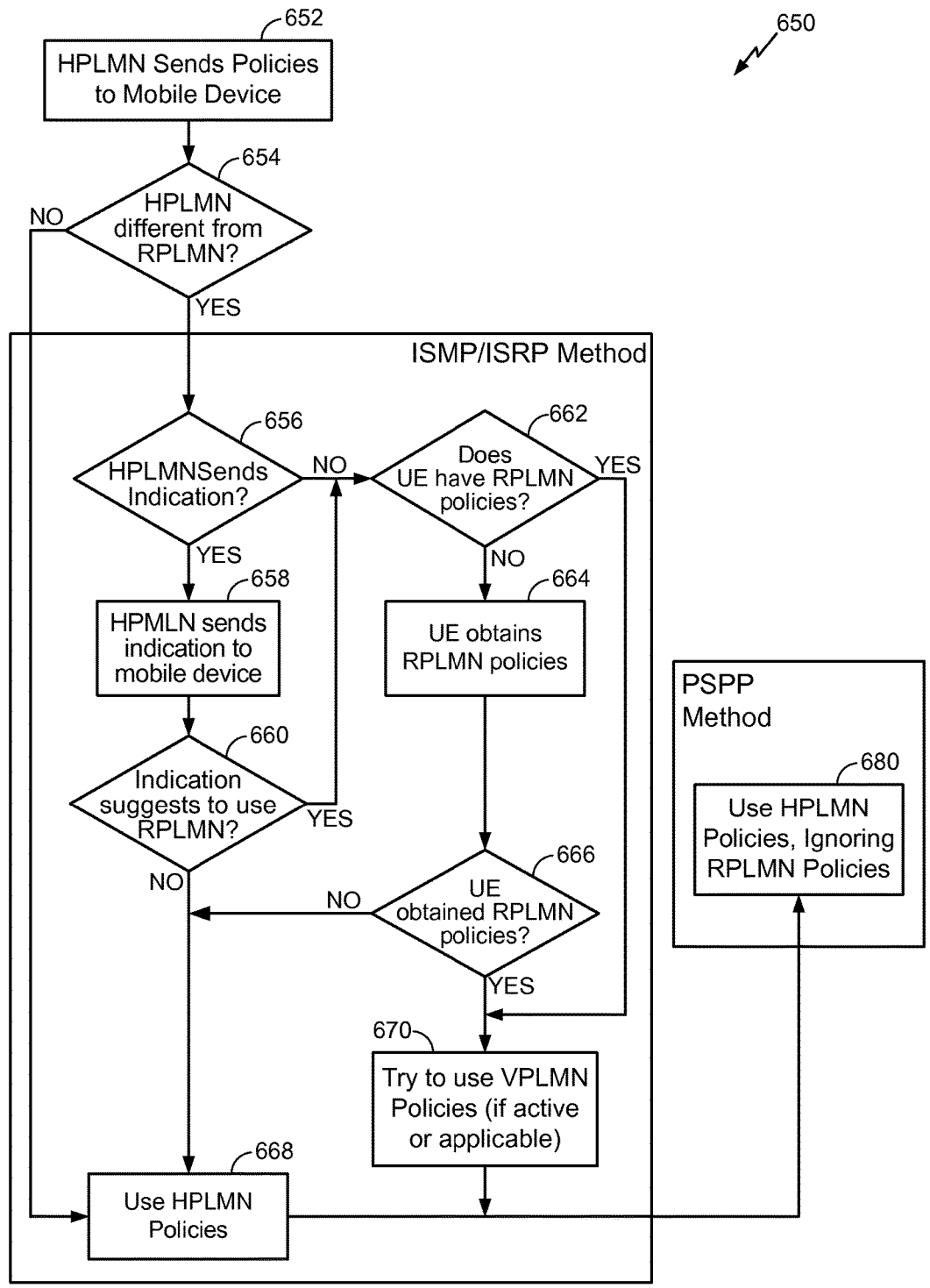
FIG. 6B is another flow diagram illustrating another exemplary method for network node selection and service provider selection.

FIG. 6B is another flow diagram illustrating an example of another method 650 for network node selection and service provider selection. The method 650 may be performed by a UE, mobile entity, or the like. Network node selection may include selection of a WLAN access point. In the alternative, or in addition, network node selection may include selection of a service provider. For example, the network node selection may be based on ISMP, ISRP, and/or PSPP rules. WLAN access point selection may be based on ISMP, ISRP. Service provider selection may be based on PSPP. The ISMP, ISRP, and/or PSPP rules may be received from a home PLMN (HPLMN) or visited PLMN (VPLMN). The VPLMN may be a registered PLMN (RPLMN). For example, the method may include, at 650, an HPLMN sending policies to a mobile device and the mobile device receiving the policies. The method 650 may include, at 652, the mobile entity determining whether the HPLMN is different from the RPLMN. If the HPLMN and RPLMN are not different (i.e., they are the same entity), then the method may use HPLMN policies, and then proceed to the PSPP method.

If the HPLMN and RPLMN are different, then the method may include, at 656, the mobile device determining whether the HPLMN sent an indication in a message (e.g., in the message with the policies). The method 650 may include, at 658, the mobile device (e.g., UE) receiving the indication from the HPLMN. The method 650 may include, at 660, determining whether the indication suggests to use RPLMN policy. For example, the indication may dictate whether the policy of the HPLMN or RPLMN is given preference/precedence. For further example, the indication may be a binary indication or a list of access nodes. In the case of a binary indication, the indication may state whether the policy of the HPLMN or the RPLMN is preferred or given precedence. In the case of the indication including a list of access nodes, the list may be a preferred list. For example, if a RPLMN is included in the list (e.g., using a matching operation or look up operation of the RPLMN name/identifier in the list), the RPLMN may be given precedence over the HPLMN. If the RPLMN is not included in the list, the RPLMN may be not be given precedence over the HPLMN (i.e., the HPLMN has precedence).

If the indication suggests using the RPLMN policies, then the method 650 may include, at 662, determining whether the UE has RPLMN policies. If the indication does not suggest using the RPLMN policies, then the method 650 may include, at 668, using the HPLMN policies, and then proceeding to the PSPP method.

If the HPLMN did not send an indication, or if the indication suggests using the RPLMN policy, then the method 650 may include, at 662, determining whether the UE has RPLMN policies. If the UE has the RPLMN policies, the method 650 may include, at 670, at least one of attempting to use, or using, the VPLMN policies if the VPLMN policies are active or applicable. If the UE has does not have the RPLMN policies, the method may include, at 664, at least one of the UE attempting to obtain, or obtaining, the RPLMN policies. The method 650 may further include, at 666, the UE determining whether it has obtained the RPLMN policies. If the UE has obtained the RPLMN policies, then the method 650 may include, at 670, at least one of the UE attempting to use, or using, the VPLMN policies. If the UE has not obtained the RPLMN policies, then the method may include, at 668, the UE using the HPLMN policies.

The method 650 may further include determining a service provider to use in the PSPP method. The HPLMN may have sent policies (e.g., PSPP policies) to the mobile device. In addition, the RPLMN may have sent policies (e.g., PSPP policies) to the mobile device. The method 650 may include, at 680, determining to use the HPLMN policies (e.g., PSPP policies) in selecting the service provider, and ignoring the RPLMN policies.

Figure 7A:
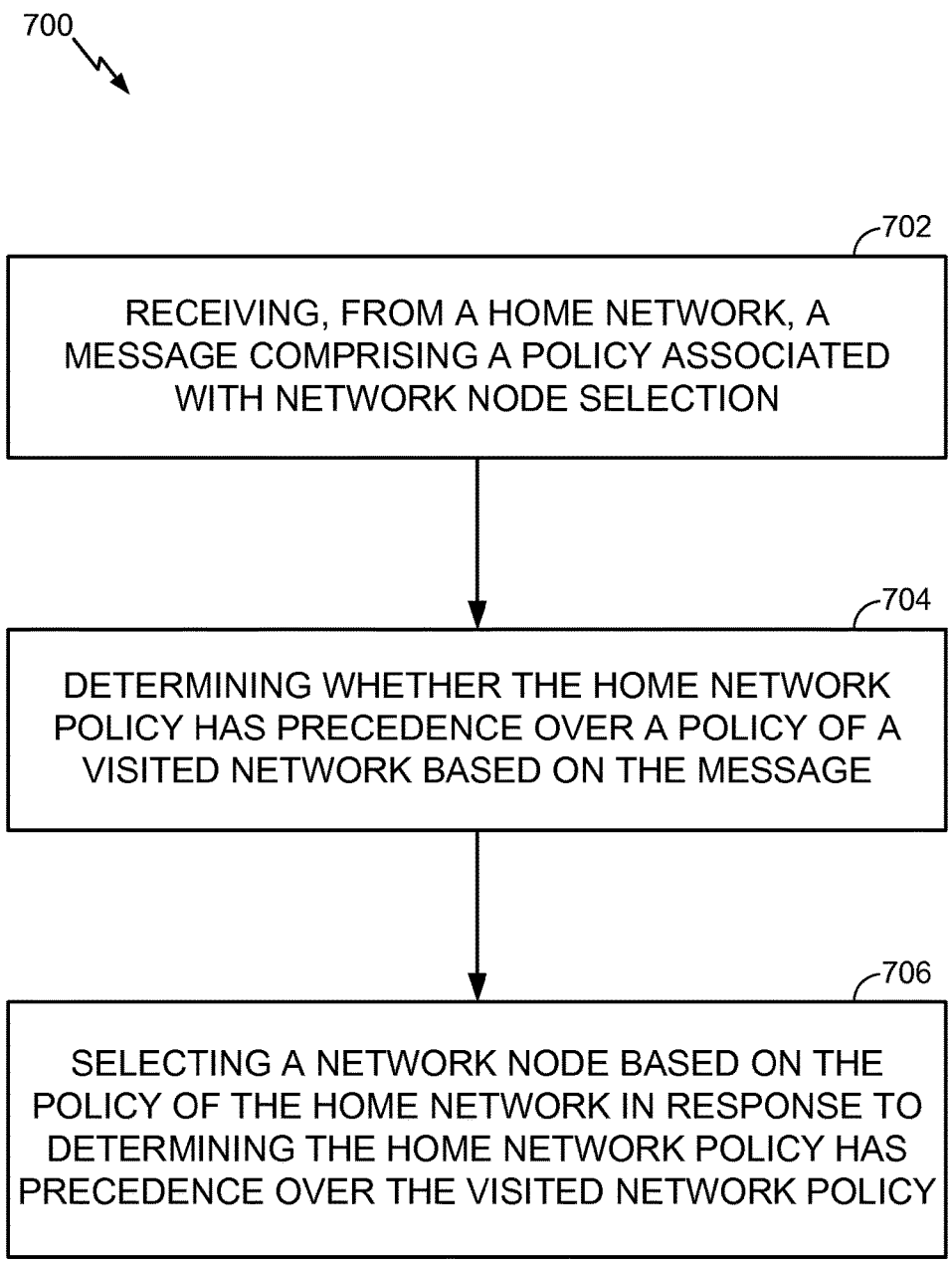
FIGS. 7A-B illustrate embodiments of methodologies for network node selection.
Figure 7B:
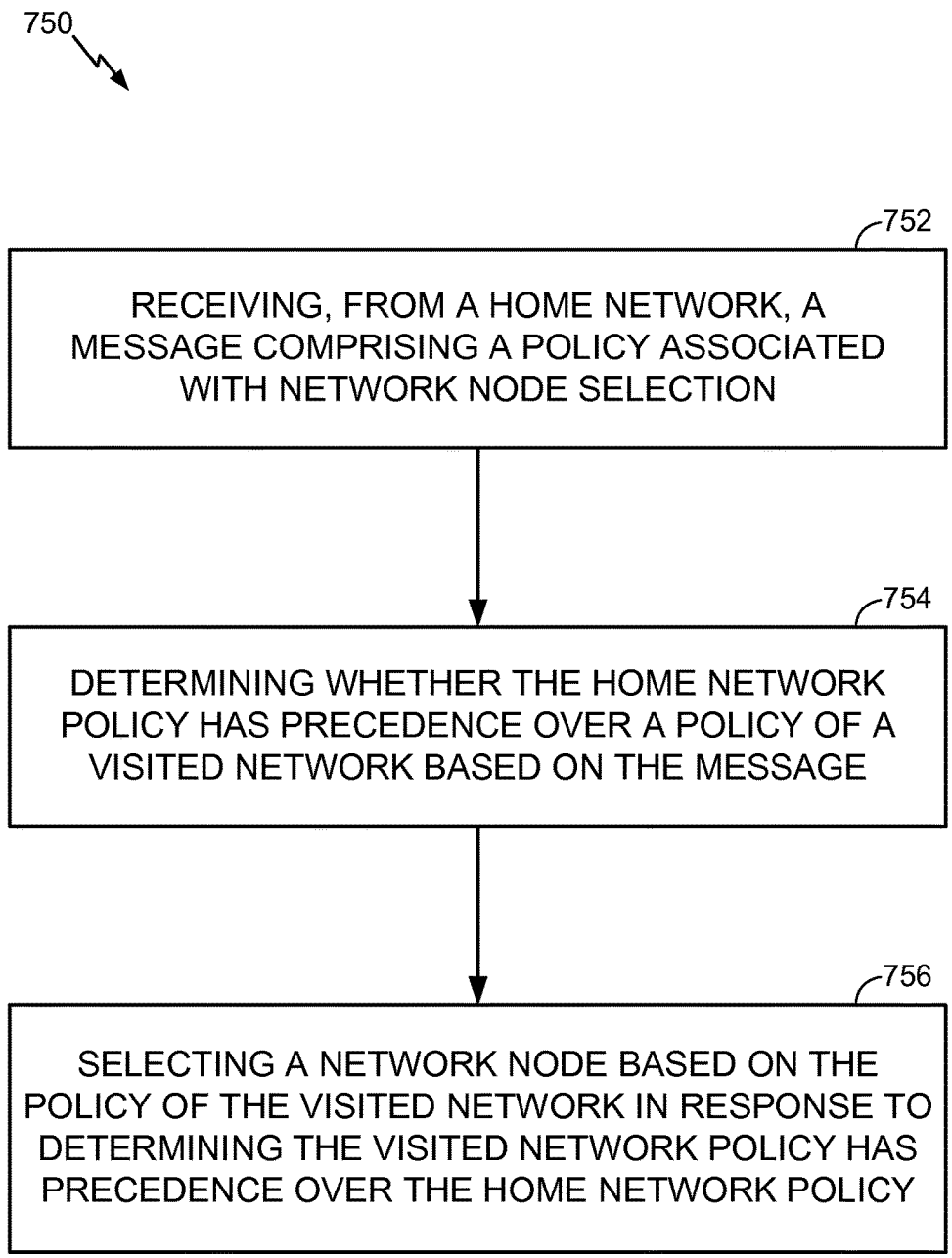

In accordance with the foregoing, FIGS. 7A-B illustrate embodiments of methodologies for network node selection. The method may be performed by a UE, mobile entity, or other access terminal. FIG. 7A illustrates one embodiment of the methodology for network node selection. The method 700 may include receiving, from a home network, a message comprising a policy associated with network node selection, at 702. The policy, for example, may indicate aspects of the home network policy pertaining to network node selection. The method 700 may include determining whether the home network policy has precedence over a policy of a visited network, based on the message, at 704. The method 700 may include selecting a network node based on the policy of the home network, in response to determining the home network policy has precedence over the visited network policy, at 706.

FIG. 7B illustrates another embodiment of the methodologies for network node selection. The method may be performed by a UE, mobile entity, or the like. The method 750 may include receiving, from a home network, a message comprising a policy associated with network node selection, at 752. The method 750 may include determining whether the home network policy has precedence over a policy of a visited network based on the message, at 754. The method 750 may include selecting a network node based on the policy of the visited network in response to determining the visited network policy has precedence over the visited network policy, at 756.

Figure 8:
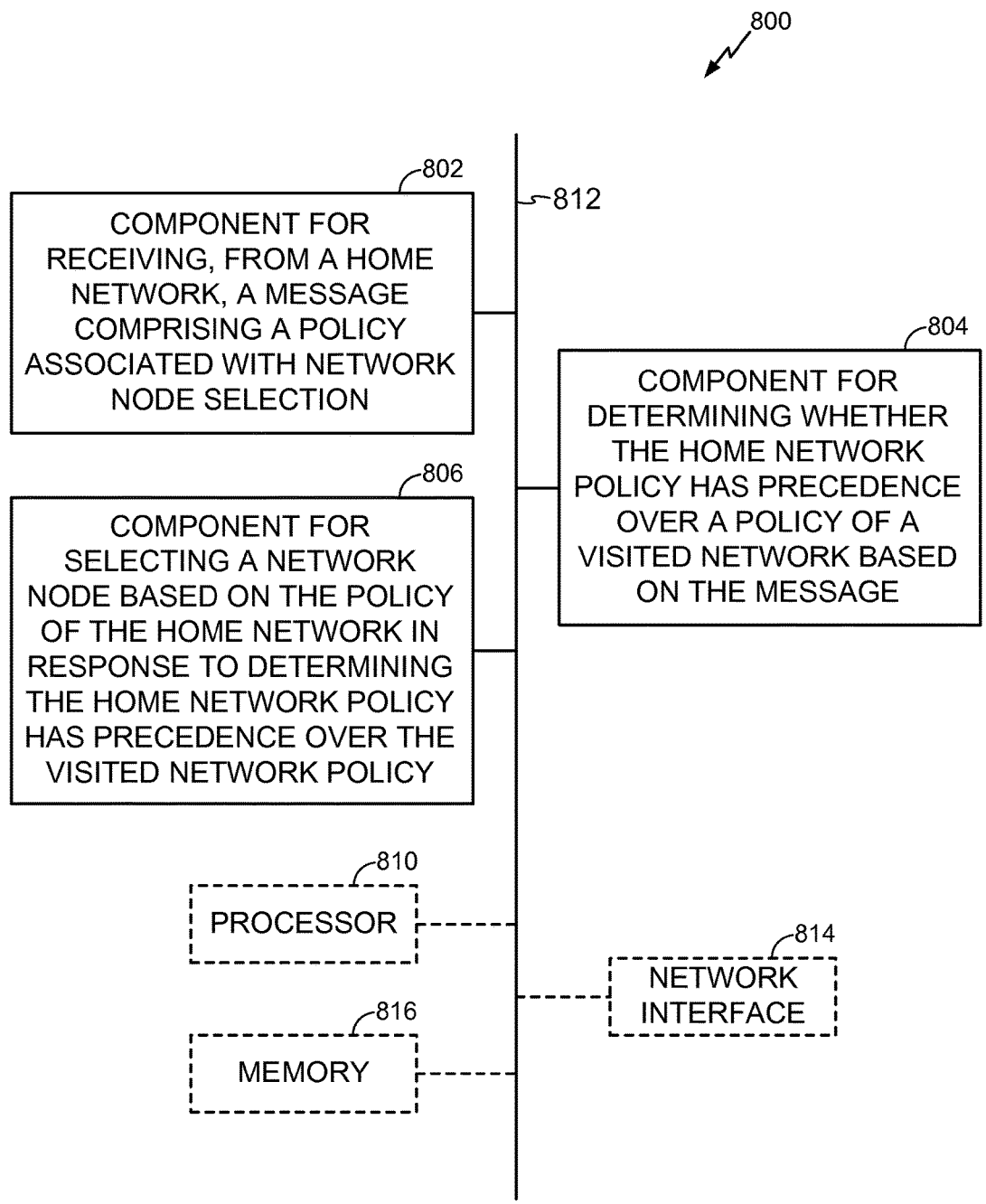
FIG. 8 illustrates an example apparatus for implementing the methodology of FIG. 7B.

With reference to FIG. 8, there is provided an exemplary apparatus 800 that may be configured as a UE, network entity, or other suitable entity, or as a processor, component or similar device for use within the UE, network entity, or other suitable entity, for network node selection. The apparatus 800 may include functional blocks that can represent functions implemented by a processor, software, or combination thereof (e.g., firmware).

As illustrated, in one embodiment, the apparatus 800 may include an electrical component or module 802 for receiving, from a home network, a message comprising a policy associated with network node selection. In an aspect, the component or module 802 may comprise means for receiving, from a home network, a message comprising a policy associated with network node selection. Said means may comprise a processor executing instructions, causing a mobile device to perform an algorithm. The algorithm may include, for example, receiving wireless signals, decoding the wireless signals thereby obtaining the message, and recognizing the policy in the message based on a predetermined control protocol.

The apparatus 800 may include an electrical component or module 804 for determining whether the home network policy has precedence over a policy of a visited network based on the message. In an aspect, the component or module 804 may comprise means for determining whether the home network policy has precedence over a policy of a visited network based on the message. Said means may comprise a processor executing instructions, causing a mobile device to perform an algorithm. The algorithm may include, for example, detecting an indication, or lack of indication, of precedence of the home network policy in the message from the home network, and determining a precedence order based on the indication or lack thereof. In an aspect, the home network may be, or may include, a home public land mobile network (H-PLMN) and the visited network may be, or may include, a visited PLMN (V-PLMN). In another aspect, the visited network may be a registered network of the mobile entity.

The apparatus 800 may include an electrical component or module 806 for selecting a network node based on the policy of the home network in response to determining the home network policy has precedence over the visited network policy. In an aspect, the component or module 806 may comprise means for selecting a network node based on the policy of the home network in response to determining the home network policy has precedence over the visited network policy. Said means may comprise a processor executing instructions, causing a mobile device to perform an algorithm. The algorithm may include, for example, determining available network nodes, and executing a decision tree as presented in connection with FIG. 6B, for example at block 508, to select one of the available network nodes.

In related aspects, the apparatus 800 may optionally include a processor component 810 having at least one processor, in the case of the apparatus 800 configured as a network entity. The processor 810, in such case, may be in operative communication with the components 802-806 or similar components via a bus 812 or similar communication coupling. The processor 810 may effect initiation and scheduling of the processes or functions performed by electrical components or modules 802-806.

In further related aspects, the apparatus 800 may include a network interface component 814 for communicating with other network entities. The apparatus 800 may optionally include a component for storing information, such as, for example, a memory device/component 816. The computer readable medium or the memory component 816 may be operatively coupled to the other components of the apparatus 800 via the bus 812 or the like. The memory component 816 may be adapted to store computer readable instructions and data for performing the activity of the components 802-806, and subcomponents thereof, or the processor 810.

The memory component 816 may retain instructions for executing functions associated with the components 802-806. While shown as being external to the memory 816, it is to be understood that the components 802-806 can exist within the memory 816.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage or other non-transitory computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Non-transitory computer-readable media includes both computer storage media and temporary memory media.

A computer-readable medium may be any available non-transitory information-retaining medium that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and Blu-ray disc where "disk" usually refers to a medium with magnetically encoded data, while "disc" usually refers to a medium with optically encoded data. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for network node selection of a user equipment (UE), the method comprising:
   receiving, from a home network, a message comprising a home network policy associated with a network node selection;
   determining, by the UE, whether the home network policy has a precedence over a visited network policy of a visited network based on an indication of a precedence between the home network policy and the visited network policy in the message;
   determining the visited network policy has the precedence based on receiving no indication of the precedence in the message;
   selecting a network node based on the home network policy in response to the determining that the home network policy has the precedence over the visited network policy; and
   selecting the network node based on the visited network policy in response to determining the visited network policy has the precedence over the home network policy.

2. The method of claim 1, wherein the home network policy comprises at least one of mobility or routing policies.

3. The method of claim 1, further comprising:
   attempting to retrieve the visited network policy in response to determining the visited network policy has the precedence; and
   selecting a network node based on the home network policy in response to failing to retrieve the visited network policy or retrieving no applicable visited network policy.

4. The method of claim 1, wherein the home network policy comprises service provider policies, and the determining comprises determining the home network policy has the precedence in the case of service provider policies.

5. The method of claim 2, wherein the home network policy further comprises service provider policies, and selecting the network node comprises selecting an access network node based on the mobility or routing policies, and selecting a service provider for authentication based on the service provider policies.

6. The method of claim 1, further comprising:
   receiving, from the visited network, another message comprising a service provider policy associated with the network node selection; and
   selecting the network node based on the service provider policy of the visited network in response to determining the visited network policy has the precedence over the home network policy.

7. The method of claim 1, further comprising:
   receiving, from the visited network, another message comprising a service provider policy associated with the network node selection; and
   ignoring the service provider policy in response to determining the home network policy has the precedence over the visited network policy.

8. The method of claim 1, wherein the receiving comprises receiving the message based on a trigger at the home network.

9. The method of claim 1, wherein the receiving comprises receiving the message in response to a request from a mobile entity.

10. The method of claim 1, wherein the visited network is a registered network of a mobile entity.

11. The method of claim 1, wherein the home network comprises a home public land mobile network (H-PLMN) and the visited network comprises a visited PLMN (V-PLMN).

12. A method for network node selection of a user equipment (UE), the method comprising:
   receiving, from a home network, a message comprising a home network policy associated with a network node selection;
   determining, by the UE, whether the home network policy has a precedence over a visited network policy of a visited network based on an indication of a precedence between the home network policy and the visited network policy in the message, wherein the indication of the precedence comprises an access node list, wherein the determining further comprises:
      comparing the visited network to entries in the access node list,
      determining the home network policy has the precedence if the visited network does not match any of the entries in the access node list, and
      determining the visited network policy has the precedence if the visited network matches any of the entries in the access node list; and
   selecting a network node based on the home network policy in response to the determining that the home network policy has the precedence over the visited network policy.

13. The method of claim 12, wherein the home network policy comprises at least one of mobility or routing policies.

14. The method of claim 12, further comprising:
   attempting to retrieve the visited network policy in response to determining the visited network policy has the precedence; and
   selecting a network node based on the home network policy in response to failing to retrieve the visited network policy or retrieving no applicable visited network policy.

15. The method of claim 12, wherein the home network policy comprises service provider policies, and the determining comprises determining the home network policy has the precedence in the case of service provider policies.

16. The method of claim 13, wherein the home network policy further comprises service provider policies, and selecting the network node comprises selecting an access network node based on the mobility or routing policies, and selecting a service provider for authentication based on the service provider policies.

17. The method of claim 12, further comprising:
receiving, from the visited network, another message comprising a service provider policy associated with the network node selection; and
selecting the network node based on the service provider policy of the visited network in response to determining the visited network policy has the precedence over the home network policy.

18. The method of claim 12, further comprising:
receiving, from the visited network, another message comprising a service provider policy associated with the network node selection; and
ignoring the service provider policy in response to determining the home network policy has the precedence over the visited network policy.

19. The method of claim 12, wherein the receiving comprises receiving the message based on a trigger at the home network.

20. The method of claim 12, wherein the receiving comprises receiving the message in response to a request from a mobile entity.

21. The method of claim 12, wherein the visited network is a registered network of a mobile entity.

22. The method of claim 12, wherein the home network comprises a home public land mobile network (H-PLMN) and the visited network comprises a visited PLMN (V-PLMN).

23. An apparatus, the apparatus being a user equipment (UE), comprising:
at least one processor configured to:
receive, from a home network, a message comprising a home network policy associated with a network node selection;
determine, by the UE, whether the home network policy has a precedence over a policy of a visited network based on an indication of a precedence between the home network policy and the visited network policy in the message;
determine that the visited network policy has the precedence based on receiving no indication of the precedence in the message;
select a network node based on the home network policy in response to the determining that the home network policy has the precedence over the visited network policy; and
select the network node based on the visited network policy in response to determining the visited network policy has the precedence over the home network policy; and
a memory coupled to the at least one processor for storing data.

24. The apparatus of claim 23, wherein the home network policy comprises at least one of mobility or routing policies.

25. The apparatus of claim 23, wherein the at least one processor is further configured for:
attempting to retrieve the visited network policy in response to determining the visited network policy has the precedence; and
selecting the network node based on the home network policy in response to failing to retrieve the visited network policy or retrieving no applicable visited network policy.

26. The apparatus of claim 24, wherein the home network policy further comprises service provider policies, and the at least one processor is further configured for selecting the network node at least in part by selecting an access network node based on the mobility or routing policies, and selecting a service provider for authentication based on the service provider policies.

27. The apparatus of claim 23, wherein the at least one processor is further configured for:
receiving, from the visited network, another message comprising a service provider policy associated with the network node selection; and
performing one of (a) selecting the network node based on the service provider policy of the visited network in response to determining the visited network policy has the precedence over the home network policy, or (b) ignoring the service provider policy in response to determining the home network policy has the precedence over the visited network policy.

28. The apparatus of claim 23, wherein the at least one processor is further configured for receiving at least in part by one of receiving the message based on a trigger at the home network, or receiving the message in response to a request from a mobile entity.

29. An apparatus, the apparatus being a user equipment (UE), comprising:
at least one processor configured to:
receive, from a home network, a message comprising a home network policy associated with a network node selection;
determine, by the UE, whether the home network policy has a precedence over a policy of a visited network based on an indication of a precedence between the home network policy and the visited network policy in the message;
wherein the indication of the precedence comprises an access node list, and the at least one processor is further configured for performing the determining at least in part by comparing the visited network to entries in the access node list, determining the home network policy has the precedence if the visited network is not matched to any of the entries in the access node list, and determining that the visited network policy has the precedence if the visited network is matched to any of the entries in the access node list; and
select a network node based on the home network policy in response to the determining that the home network policy has the precedence over the visited network policy; and
a memory coupled to the at least one processor for storing data.

30. The method of claim 29, wherein the home network policy comprises at least one of mobility or routing policies.

31. The method of claim 29, wherein the at least one processor is further configured for:
attempting to retrieve the visited network policy in response to determining the visited network policy has the precedence; and
selecting the network node based on the home network policy in response to failing to retrieve the visited network policy or retrieving no applicable visited network policy.

32. The method of claim 30, wherein the home network policy further comprises service provider policies, and the at least one processor is further configured for selecting the network node at least in part by selecting an access network node based on the mobility or routing policies, and selecting a service provider for authentication based on the service provider policies.

33. The method of claim 29, wherein the at least one processor is further configured for:
receiving, from the visited network, another message comprising a service provider policy associated with the network node selection; and
performing one of (a) selecting the network node based on the service provider policy of the visited network in response to determining the visited network policy has the precedence over the home network policy, or (b) ignoring the service provider policy in response to determining the home network policy has the precedence over the visited network policy.

34. The method of claim 29, wherein the at least one processor is further configured for receiving at least in part by one of receiving the message based on a trigger at the home network, or receiving the message in response to a request from a mobile entity.

35. An apparatus, the apparatus being a user equipment (UE), comprising:
means for receiving, from a home network, a message comprising a home network policy associated with a network node selection;
means for determining whether the home network policy has a precedence over a policy of a visited network based on an indication of a precedence between the home network policy and the visited network policy in the message;
means for determining that the visited network policy has the precedence based on receiving no indication of the precedence in the message;
means for selecting the network node based on the home network policy in response to the determining that the home network policy has the precedence over the visited network policy;
means for selecting the network node based on the visited network policy, in response to determining the visited network policy has the precedence over the home network policy.

36. The apparatus of claim 35, wherein the home network policy comprises at least one of mobility or routing policies.

37. The apparatus of claim 35, further comprising means for:
attempting to retrieve the visited network policy in response to determining the visited network policy has the precedence; and
selecting the network node based on the home network policy in response to failing to retrieve the visited network policy or retrieving no applicable visited network policy.

38. The apparatus of claim 36, wherein the home network policy further comprises service provider policies, and the apparatus further comprises means for selecting the network node at least in part by selecting an access network node based on the mobility or routing policies, and selecting a service provider for authentication based on the service provider policies.

39. An apparatus, the apparatus being a user equipment (UE), comprising:
means for receiving, from a home network, a message comprising a home network policy associated with a network node selection;
means for determining whether the home network policy has a precedence over a policy of a visited network based on an indication of a precedence between the home network policy and the visited network policy in the message;
wherein the indication of the precedence comprises an access node list, and the apparatus further comprises means for performing the determining at least in part by comparing the visited network to entries in the access node list, determining the home network policy has the precedence if the visited network is not matched to any of the entries in the access node list, and determining the visited network policy has the precedence if the visited network is matched to any of the entries in the access node list; and
means for selecting the network node based on the home network policy in response to the determining that the home network policy has the precedence over the visited network policy.

40. The method of claim 39, wherein the home network policy comprises at least one of mobility or routing policies.

41. The method of claim 39, further comprising means for:
attempting to retrieve the visited network policy in response to determining the visited network policy has the precedence; and
selecting the network node based on the home network policy in response to failing to retrieve the visited network policy or retrieving no applicable visited network policy.

42. The method of claim 40, wherein the home network policy further comprises service provider policies, and the apparatus further comprises means for selecting the network node at least in part by selecting an access network node based on the mobility or routing policies, and selecting a service provider for authentication based on the service provider policies.

43. A non-transitory computer readable medium comprising code for causing at least one processor to:
receive, from a home network, a message comprising a policy associated with a network node selection;
determine, by a user equipment (UE), whether the home network policy has a precedence over a policy of a visited network based on an indication of a precedence between the home network policy and the visited network policy in the message;
determine the visited network policy has the precedence based on receiving no indication of the precedence in the message;
select a network node based on the home network policy in response to the determining that the home network policy has the precedence over the visited network policy; and
select the network node based on the visited network policy in response to determining the visited network policy has the precedence over the home network policy.

* * * * *